(12) United States Patent
Burnham et al.

(10) Patent No.: US 7,001,106 B2
(45) Date of Patent: Feb. 21, 2006

(54) INSTALLATION OF SERVICE CONNECTIONS FOR SENSORS OR TRANSMITTERS IN BURIED WATER PIPES

(75) Inventors: Alan K. Burnham, Livermore, CA (US); John F. Cooper, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/854,453

(22) Filed: May 26, 2004

(65) Prior Publication Data

US 2005/0008436 A1 Jan. 13, 2005

Related U.S. Application Data

(60) Provisional application No. 60/485,465, filed on Jul. 8, 2003.

(51) Int. Cl.
*E03B 7/07* (2006.01)
(52) U.S. Cl. .................... 405/157; 405/156; 405/184.1
(58) Field of Classification Search ................ 405/156, 405/157; 137/557–559; 340/618; 73/40.5 R
See application file for complete search history.

(56) References Cited

U.S. PATENT DOCUMENTS

| 5,358,283 A | * | 10/1994 | Silva ............................ 285/24 |
| 5,636,653 A | * | 6/1997 | Titus ........................... 137/551 |
| 5,699,049 A | * | 12/1997 | Difiore ........................ 340/618 |
| 5,739,420 A | * | 4/1998 | Peterson .................. 73/40.5 R |
| 6,286,542 B1 | * | 9/2001 | Morain et al. .............. 405/156 |
| 6,389,881 B1 | | 5/2002 | Yang et al. |
| 6,720,882 B1 | * | 4/2004 | Davey ........................ 137/557 |
| 2002/0189362 A1 | | 12/2002 | Havlena |

FOREIGN PATENT DOCUMENTS

WO    WO 02/103303 A1    12/2002

\* cited by examiner

*Primary Examiner*—Frederick L. Lagman
(74) *Attorney, Agent, or Firm*—Eddie E. Scott; Alan H. Thompson

(57) ABSTRACT

A system for installing warning units in a buried pipeline. A small hole is drilled in the ground to the pipeline. A collar is affixed to one of the pipes of the pipeline. A valve with an internal passage is connected to the collar. A hole is drilled in the pipe. A warning unit is installed in the pipe by moving the warning unit through the internal passage, the collar, and the hole in the pipe.

2 Claims, 2 Drawing Sheets

US 7,001,106 B2

INSTALLATION OF SERVICE CONNECTIONS FOR SENSORS OR TRANSMITTERS IN BURIED WATER PIPES

CROSS-REFERENCE TO RELATED APPLICATIONS

This application claims the benefit of U.S. Provisional Patent Application No. 60/485,465 filed Jul. 8, 2003 and titled "Installation of Service Connections for Sensors and Transmitters in Buried Water Pipes." U.S. Provisional Patent Application No. 60/485,465 filed Jul. 8, 2003 and titled "Installation of Service Connections for Sensors and Transmitters in Buried Water Pipes" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to buried pipelines and more particularly to a system for installation of service connections in buried pipelines.

2. State of Technology

A news release on Nov. 26, 2001, *Water Supplies Need Better Protection* by Richard G. Luthy, Copyright© 2003 National Academy of Sciences, provides the following state of technology information, "The United States' water supply systems are among the greatest engineering accomplishments of the past century. Large investments by local, state, and federal government agencies led to many improvements in the supply, treatment, and distribution of water. The payoff has been great strides in improving public health. Protecting water sources and installing treatment plants virtually eliminated the most deadly waterborne diseases such as typhoid and cholera. Today, we enjoy the safest drinking water in the world. But since the terrorist acts on September 11, questions have arisen about the vulnerability of our water systems to deliberate attacks. In addition, many components are aging and need replacement. Thus, in the context of today's war on terrorism, both the infrastructure and protection of water systems must be considered in a new light. Safeguarding water supplies from sabotage will require engineering analysis and problem-solving, scientific advances, and evaluation of institutional arrangements and water policies. Top priority should be given to protecting physical water storage and transmission structures that serve large populations. Many dams, aqueducts, and pumping stations that capture and convey water over long distances are especially vulnerable to physical damage and would be difficult to replace."

United States Patent Application No. 2002/0189362 by Vladimir Havlena for communication for water distribution networks, published Dec. 19, 2002, provides the following state of technology information, "Control of processes is a broad general concern for every industry, particularly where fluids such as water are distributed in a network of pipes, vessels, containers and tanks. Often it is necessary to know conditions at various remote locations in a process in order to control the overall operation effectiveness and efficiency of production. One particular industry that requires significant control and which presently does not have adequate abilities for this goal is the water distribution networks that bring potable water from water supply sources and water treatment plants providing these water supply sources. It is well recognized that interruption of fluid flow in systems such as water supply systems needs to be minimized to identify and repair any interruption, such as by a pipe rupture or puncture, or by blockage of the line of flow."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for installing warning units in a buried pipeline. A small hole is drilled in the ground to the pipeline. A collar is affixed to one of the pipes of the pipeline. A valve with an internal passage is connected to the collar. A hole is drilled in the pipe. A warning unit is installed in the pipe by moving the warning unit through the internal passage, the collar, and the hole in the pipe. In one embodiment of the present invention the warning unit is a sensor. In another embodiment of the present invention the warning unit is a transmitter. In another embodiment of the present invention the warning unit is a receiver. The present invention present invention can be used to install water quality monitoring sensors into buried water pipes or the present invention can be used to install a service connection for any purpose.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
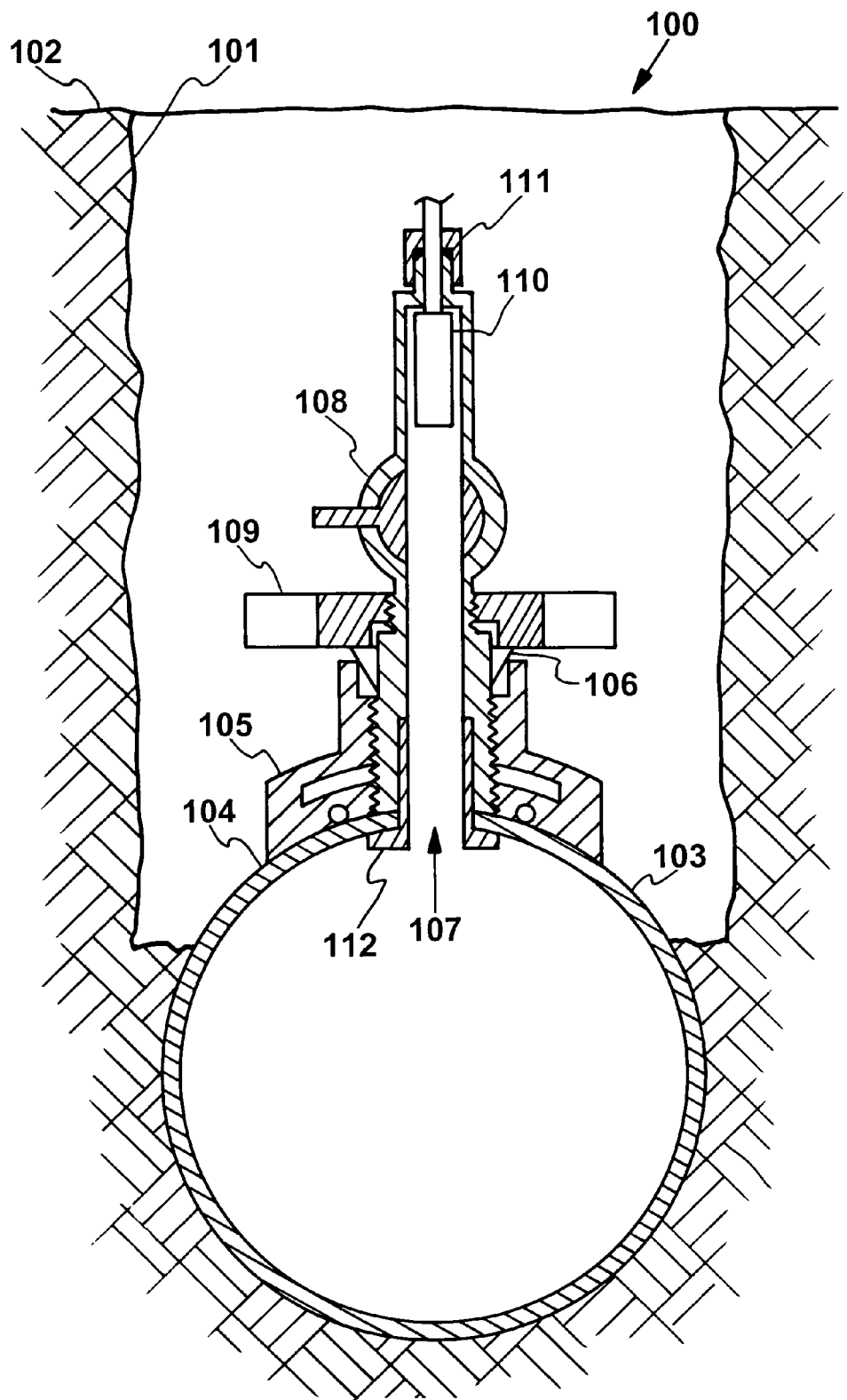
FIG. 1 illustrates an embodiment of a service connection system constructed in accordance with the present invention.

Referring now to the drawings, to the following detailed description, and to incorporated materials, detailed information about the invention is provided including the description of specific embodiments. The detailed description serves to explain the principles of the invention. The invention is susceptible to modifications and alternative forms.

The invention is not limited to the particular forms disclosed. The invention covers all modifications, equivalents, and alternatives falling within the spirit and scope of the invention as defined by the claims.

Referring now to FIG. 1, an embodiment of a service connection system constructed in accordance with the present invention is illustrated. The system is designated generally by the reference numeral 100. The system 100 provides an inexpensive method of installing a warning unit such as water monitoring sensors, transmitters, or receivers into a water distribution network.

A hole 101 substantially smaller than a person can fit into is drilled from the ground surface 102 above a pipe 103 to the upper surface 104 of the pipe 103. A drilling collar/pipe reinforcement fitting 105 is affixed to the pipe 103 with a waterproof glue. A combination shutoff valve/clamp 106 is screwed into the collar 105. A hole 107 is drilled into the pipe 103 through a valve 108. The drill is removed and the valve 108 closed. Clamps 112 are engaged by screwing the combination valve/clamp first in and then out to provide a positive lock of the fixture to the pipe. The compression fitting 106 is then tightened by turning collar 109 to provide a watertight seal.

A sensor/transmitter 110 is positioned in the passage above the valve 108. The valve 108 is opened and the sensor/transmitter 110 is moved into place inside the pipe 103. A compression seal 111 locks the sensor/transmitter 110 in place in the pipe 103 and provides a watertight seal.

The system 100 provides a fitting 106 that enables a warning unit such as sensor/transmitter 110 to be installed into a buried pipe 103 without extensive excavation. The system 100 can be used in installing water quality monitoring sensors into buried water pipes. The system 100 can also be used to install a service connection for any purpose. The system 100 can be used to install connections in any buried fluid distribution system with minimal excavation.

Figure 2:
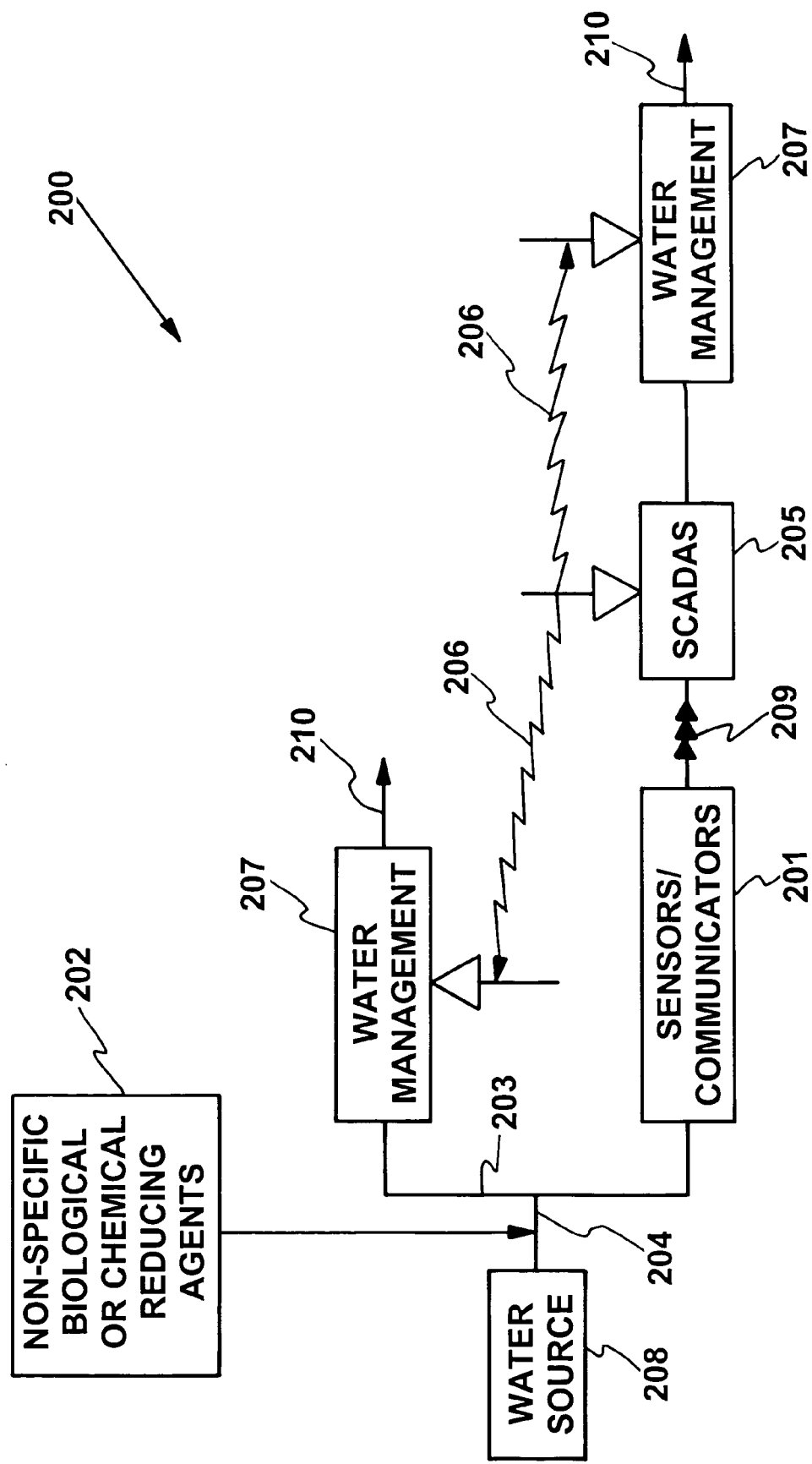
FIG. 2 illustrates an embodiment of a service connection system that is illustrated in connection with a water distribution early warning system for warning of contamination.

Referring now to FIG. 2, an embodiment of service connection system is illustrated in connection with a water distribution early warning system for warning of contamination. The contamination can be unauthorized contamination or accidental contamination. This embodiment is designated generally by the reference numeral 200.

Water flows from a water source 208 through pipes 203. By way of example, the water source 208 can be a treated (e.g., chlorinated, filtered) water municipal distribution system. A news release on Nov. 26, 2001, *Water Supplies Need Better Protection* by Richard G. Luthy, Copyright© 2003 National Academy of Sciences, provides a warning that, "since the terrorist acts on September 11, questions have arisen about the vulnerability of our water systems to deliberate attacks. In addition, many components are aging and need replacement. Thus, in the context of today's war on terrorism, both the infrastructure and protection of water systems must be considered in a new light. Safeguarding water supplies from sabotage will require engineering analysis and problem-solving, scientific advances, and evaluation of institutional arrangements and water policies. Top priority should be given to protecting physical water storage and transmission structures that serve large populations. Many dams, aqueducts, and pumping stations that capture and convey water over long distances are especially vulnerable to physical damage and would be difficult to replace."

The system 200 includes an array of autonomous sensors/communicators 201 that are exposed to water flow 210 that flows through the pipes 204 from the water source 208. The array of autonomous sensors/communicators 201 detects, for example, the loss of chlorination shield upon any introduction of non-specific biological or chemical reducing agents 202 into the water 210. Any compact sensor to detect any water property can be used. Each sensor communicates by emitting acoustic signal burst 209, using the pipes 203 as wave-guides or channels. The preexisting Supervisory Control and Data Acquisition Systems (SCADAS) 205 receive the signal 209 and communicate by radio 206 to water management 207 where appropriate action can be taken.

The sensors/communicators 201 communicate by emitting acoustic signal bursts 209, using the pipes 204 as wave-guides or channels. The Supervisory Control and Data Acquisition Systems (SCADAS) 205 receive the signal 209 and communicate by radio 206 to water management 207. Systems for providing communication through fluid filled pipes are known, for example, various systems are shown in U.S. patent application No. 2002/0189362 published Dec. 19, 2002 and International Patent Application No. WO 02/103303 published Dec. 27, 2002. Both patent applications are owned by Honeywell International Inc. and were invented by Vladimar Havlena. The disclosures of U.S. patent application No. 2002/0189362 published Dec. 19, 2002 and International Patent Application No. WO 02/103303 published Dec. 27, 2002 are incorporated herein by this reference.

The system 200 can detect gross biological or chemical contamination, or agent that would defeat of the chlorination shield using a reducing agent (e.g., glucose, ascorbate, thiosulfate, hyposulfite, or ferrocyanide, and many other common reducing agents) preliminary to the introduction of biological or chemical agent that might be destroyed by the ca. 2 ppm ambient chlorine or chlorine-equivalent concentration. In addition to the oxidation potential and pH sensing, the system 200 has applicability and use for: elemental chlorine, chloramines, oxidative oxy-halogen compounds, ozone, oxygen, peroxydisulfate, peroxymonosulfate; strong reducing agents including hyposulfite, thiosulfate, ferrocyanide, sulfide, $H_2S$; and specific ions and solid/liquid dispersions of cyanide, selenium, lead, mercury and arsenic containing compounds; specific nerve and blistering agents including but not necessarily limited to VX, Lewisite, G-agents, phosgene, and mustard gases; and radiological sources including actinides and radioactive isotopes of iodine, cesium, strontium, thorium and cobalt. The sensors/communicators 201 may include specific sensors for biological materials, biochemicals or live, dead or sporulated bacteriological, viral or microbial organisms.

The system 200 provides an inexpensive distributed sensor network that can help assure the water quality in water distribution systems. The system 200 can be installed in existing pipes. The sensors/communicators 201 are installed by digging a hole substantially smaller than a person can fit into from the ground surface above the pipes 204 to the upper surface of the pipes 204. A drilling collar/pipe reinforcement fitting is affixed to the pipe 204 with a waterproof glue, and a combination shutoff valve/clamp is screwed into the collar. A hole is drilled into the pipe 204 through the open valve, the drill removed, and the shutoff valve closed. Clamps are engaged by screwing the combination valve/clamp first in and then out. A compression fitting 11 is then tightened to provide a watertight seal. The system 200 provides an inexpensive method of installing water monitoring sensors/communicators, transmitters, and receivers into a water distribution network.

The system 200 use in installing water quality monitoring sensors into buried water pipes. The system 200 can be used to install a service connection for any purpose. The system 200 can be used to install connections in any buried fluid distribution system with minimal excavation.

The system 200 is low in cost. The signal (e.g., a 32 bit binary code) is transmitted to pre-existing monitoring sites or Supervisory Control and Data Acquisition systems 205 that are linked to water management 207. Each system is wireless and autonomous, being powered by a primary battery, micro fuel cell, or a secondary battery trickle charged by a thermoelectric device, solar cell, or a water-powered generator.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A product comprising a warning unit in a pipe buried in the ground, wherein the ground has a ground surface above the pipe and the pipe has an upper surface, said product being produced by the process comprising the steps of:

digging a hole in the ground from the ground surface above the pipe to the pipe, said hole being smaller than a person can fit into, affixing a collar to the upper surface of the pipe with a waterproof glue between said collar and said upper surface of the pipe for affixing said collar to the pipe, attaching a valve to said collar, said valve having a passage communicating with said collar, drilling a hole in the pipe through said internal passage of said valve and through said upper surface of the pipe, and installing the warning unit in the pipe by moving the warning unit through said passage of said valve, said collar, and said hole in the pipe into place in the buried pipe, wherein said warning unit is a water monitoring sensor.

2. A method of installing warning unit in a pipe buried in the ground, the ground having a ground surface above the pipe and the pipe having an upper surface comprising the steps of:

digging a hole in the ground from the ground surface above the pipe to the pipe, said hole being smaller than a person can fit into, affixing a collar to the upper surface of the pipe with a waterproof glue being located between said collar and said upper surface of the pipe for affixing said collar to the pipe, attaching a valve with an internal passage to said collar, drilling a hole in the pipe through said internal passage of said valve and through said upper surface of the pipe, and installing the warning unit in the pipe by moving the warning unit through said internal passage of said valve, said collar, and said hole in the pipe, wherein said warning unit is a water-monitoring sensor.

* * * * *